United States Patent
Kim

(10) Patent No.: US 12,386,077 B2
(45) Date of Patent: Aug. 12, 2025

(54) METHOD AND APPARATUS FOR TRANSMITTING AND RECEIVING CHARACTERISTIC INFORMATION OF GNSS SUBFRAME

(71) Applicant: Electronics and Telecommunications Research Institute, Daejeon (KR)

(72) Inventor: Jung Bin Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 296 days.

(21) Appl. No.: 17/843,280

(22) Filed: Jun. 17, 2022

(65) Prior Publication Data
US 2022/0404510 A1 Dec. 22, 2022

(30) Foreign Application Priority Data

Jun. 21, 2021 (KR) .................. 10-2021-0080107
May 20, 2022 (KR) .................. 10-2021-0062049

(51) Int. Cl.
*G01S 19/25* (2010.01)
*G01S 19/11* (2010.01)
*G01S 19/12* (2010.01)
*G01S 19/24* (2010.01)
*G01S 19/05* (2010.01)
*G01S 19/30* (2010.01)

(52) U.S. Cl.
CPC ............ *G01S 19/256* (2013.01); *G01S 19/11* (2013.01); *G01S 19/12* (2013.01); *G01S 19/243* (2013.01); *G01S 19/05* (2013.01); *G01S 19/30* (2013.01)

(58) Field of Classification Search
CPC ...... G01S 19/02; G01S 19/243; G01S 19/256; G01S 19/05; G01S 19/11; G01S 19/12; G01S 19/30; G01S 19/42
USPC ............ 342/357.63, 357.64, 357.42, 357.48, 342/357.49, 357.69, 357.25
See application file for complete search history.

(56) References Cited

U.S. PATENT DOCUMENTS

| | | | |
|---|---|---|---|
| 7,720,601 B2 | 5/2010 | Zhao et al. | |
| 7,924,947 B2* | 4/2011 | Tapucu | G01S 19/243 375/150 |
| 8,031,111 B2 | 10/2011 | Ferguson et al. | |
| 8,621,335 B2 | 12/2013 | Young | |
| 8,903,026 B2* | 12/2014 | Ting | G01S 19/243 375/340 |

(Continued)

FOREIGN PATENT DOCUMENTS

| | | | | |
|---|---|---|---|---|
| KR | 20160023857 A | * | 3/2016 | H04L 5/0064 |
| WO | WO-2020059219 A1 | * | 3/2020 | G01S 19/243 |

*Primary Examiner* — Chuong P Nguyen
(74) *Attorney, Agent, or Firm* — KILE PARK REED & HOUTTEMAN PLLC

(57) ABSTRACT

Disclosed are methods and apparatuses for transmitting and receiving characteristic information of a GNSS subframe. A method for transmitting and receiving characteristic information of a GNSS subframe, as a method for a first device, may comprise: receiving a subframe including first information, which is characteristic information of the subframe, from a second device; checking a format of the subframe on the basis of the first information; and determining whether to decode data included in the subframe on the basis of the checked format of the subframe.

10 Claims, 4 Drawing Sheets

(56) References Cited

U.S. PATENT DOCUMENTS

| | | | |
|---|---|---|---|
| 9,231,690 B2* | 1/2016 | Hoang | H04B 7/18513 |
| 9,405,009 B2* | 8/2016 | Rao | G01S 19/02 |
| 9,645,244 B2* | 5/2017 | Lin | G01S 19/33 |
| 10,330,793 B2* | 6/2019 | Lin | G01S 19/33 |
| 10,511,668 B2 | 12/2019 | Kim et al. | |
| 11,681,051 B2* | 6/2023 | Takanohashi | H04B 1/7073 |
| | | | 342/357.69 |
| 2006/0126762 A1* | 6/2006 | Tapucu | G01S 19/243 |
| | | | 375/340 |
| 2012/0092214 A1 | 4/2012 | Lee et al. | |
| 2013/0141278 A1* | 6/2013 | Rao | G01S 19/02 |
| | | | 342/357.44 |
| 2013/0300600 A1 | 11/2013 | Park | |
| 2015/0078249 A1 | 3/2015 | Hoang et al. | |
| 2016/0212724 A1* | 7/2016 | Seo | H04W 56/0025 |
| 2017/0238260 A1* | 8/2017 | Kim | H04L 1/1819 |
| | | | 455/522 |
| 2019/0257945 A1 | 8/2019 | Price et al. | |
| 2020/0116869 A1 | 4/2020 | Lennen | |
| 2022/0035044 A1 | 2/2022 | Cookman et al. | |

* cited by examiner

FIG. 1

| master frame | | | |
|---|---|---|---|
| subframe 1 | subframe 2 | subframe 3 | subframe 4 |
| 600 symbols | 600 symbols | 600 symbols | 600 symbols |

FIG. 2

| subframe (600 symbols) | |
|---|---|
| sync code | navigation data |
| 16 bits | 584 symbols |

FIG. 3

| 1 | 9 | 26 | 27 | 28 | 30 | 31 | 263 | 287 |
|---|---|---|---|---|---|---|---|---|
| TLM | TOWC | alert | AUTONAV | subframe ID | spare | data | CRC | tail |
| 8bits | 17bits | 1bits | 1bits | 2bits | 1bits | 232bits | 24bits | 6bits |

FIG. 4

| 1 | 9 | 26 | 27 | 28 | 30 | 31 | 37 | 257 | 263 | 287 |
|---|---|---|---|---|---|---|---|---|---|---|
| TLM | TOWC | alert | AUTONAV | subframe ID | spare | message ID | data | PRN ID | CRC | tail |
| 8bits | 17bits | 1bits | 1bits | 2bits | 1bits | 6bits | 220bits | 6bits | 24bits | 6bits |

FIG. 7

| subframe | | |
|---|---|---|
| sync word | subframe characteristic indicator | subframe data |
| 16 bits | a bits | 584 − a bits |

FIG. 8

| subframe | | | |
|---|---|---|---|
| first subframe characteristic indicator | sync word | second subframe characteristic indicator | subframe data |
| a/2 bits | 16 bits | a/2 bits | 584 − a bits |

METHOD AND APPARATUS FOR TRANSMITTING AND RECEIVING CHARACTERISTIC INFORMATION OF GNSS SUBFRAME

CROSS-REFERENCE TO RELATED APPLICATIONS

This application claims priority to Korean Patent Applications No. 10-2021-0080107, filed on Jun. 21, 2021, and No. 10-2022-0062049 filed on May 20, 2022 with the Korean Intellectual Property Office (KIPO), the entire contents of which are hereby incorporated by reference.

BACKGROUND

1. Technical Field

Example embodiments of the present disclosure relate to a method and/or apparatus for transmitting and receiving characteristic information, and more particularly, to a method and/or apparatus for transmitting characteristic information of a Global Navigation Satellite System (GNSS) subframe.

2. Related Art

A global navigation satellite system (GNSS), such as Indian regional navigation satellite system (IRNSS) of India (or, navigation with Indian constellation (NavIC)), global navigation satellite system (GPS) of the United States, global navigation satellite system (GLONASS) of Russia, Galileo of Europe, or the like, is a system for measuring accurate time and location information by receiving information about the location, time, and other correction factors of satellites from the satellites.

Meanwhile, in a satellite navigation system, a receiver may receive a subframe after subframe synchronization is acquired, and after decoding is performed, it may acquire information delivered by each subframe. At this time, there is a problem that even if it is a subframe including data that the terminal cannot use or does not need, the receiver should receive and/or decode the above-mentioned subframe and examine information of each item to determine whether the corresponding subframe is what it needs.

SUMMARY

An object of the present disclosure to solve the above problems is to provide a method and/or apparatus for transmitting and receiving characteristic information of a Global Navigation Satellite System (GNSS) subframe.

According to a first exemplary embodiment of the present disclosure, a method for a first device may comprise: receiving a subframe including first information, which is characteristic information of the subframe, from a second device; checking a format of the subframe on the basis of the first information; and determining whether to decode data included in the subframe on the basis of the checked format of the subframe.

The first information may be indicated by a sync word included in the subframe.

The method may further comprise, the first device determines to perform decoding of the data, performing a decoding operation of the data on the basis of coding rate information used for channel coding of the data indicated by the first information.

The method may further comprise, before the operation of determining whether to decode data; determining whether to receive data included in the subframe on the basis of the first information; and operating in a sleep mode for a preset time the first device determines not to receive the data included in the subframe.

When a mapping relationship between the first information and the subframe number of the subframe is preset, the subframe number may be checked based on the sync word.

When a mapping relationship between the first information and the accuracy of the subframe is preset, the accuracy of the subframe may be checked based on the sync word, and the accuracy may be the accuracy of navigation information indicated by the data included in the subframe.

When a mapping relationship between the first information and whether or not channel coding of the subframe is used is preset, whether or not the channel coding of the subframe is used may be checked based on the sync word.

When the subframe includes a sync word, a subframe characteristic indicator, and the data, the first information may be indicated by the subframe characteristic indicator.

When a mapping relationship between the first information and each of the subframe number and the accuracy of the subframe is preset, each of the subframe number and the accuracy of the subframe may be checked based on the subframe characteristic indicator, and the accuracy may be the accuracy of navigation information indicated by the data included in the subframe.

When a mapping relationship between the first information and the accuracy of the subframe is preset, the accuracy of the subframe may be checked based on the subframe characteristic indicator.

According to a second exemplary embodiment of the present disclosure, a method for a second device may comprise: generating data having a first characteristic; generating first information indicating the first characteristic; generating a subframe including the data and a field associated with the first information; and transmitting the subframe, wherein the first information is used to determine whether to decode the data included in the subframe.

The field may be a sync word, and a mapping relationship between the first information and the sync word may be preset.

The first information may indicate coding rate information used for channel coding of the data, and the coding rate information may be used to decode the data.

When a mapping relationship between the first information and each of the subframe number and the accuracy of the subframe is preset, each of the subframe number and the accuracy of the subframe may be checked based on the sync word, and the accuracy may be the accuracy of navigation information indicated by the data included in the subframe.

When a mapping relationship between the first information and whether or not channel coding of the subframe is used is preset, the sync word may indicate whether or not the channel coding of the subframe is used.

According to a third exemplary embodiment of the present disclosure, a first device may comprise: a processor; a memory configured to electronically communicate with the processor; and instructions stored in the memory, wherein when the instructions are executed by the processor, the instructions cause the first device to: receive a subframe including first information, which is characteristic information of the subframe, from a second device; check a format of the subframe on the basis of the first information; and determine whether to decode data included in the subframe on the basis of the format of the subframe.

The first information may be indicated by a sync word included in the subframe.

When the subframe includes a sync word, a subframe characteristic indicator, and the data, the first information may be indicated by the subframe characteristic indicator.

According to the present disclosure, a receiver can discern the characteristics of a subframe to discern data state information, a data content type, and/or a data content change of the subframe and can perform a reception and/or decoding operation suitable for the corresponding subframe or the purpose of the receiver on the basis of subframe characteristics.

Also, according to the present disclosure, a satellite navigation system can configure and transmit and receive subframes adaptively for each channel, and a receiver can save power required for unnecessary data reception by avoiding unnecessary reception operations and can derive a navigation solution quickly with a low error rate.

BRIEF DESCRIPTION OF DRAWINGS

FIG. 1 is a conceptual diagram showing a first embodiment of a master frame structure of the Navigation Indian Constellation (NavIC).

FIG. 2 is a conceptual diagram showing a first embodiment of the subframe structure of the NavIC.

FIG. 3 is a conceptual diagram illustrating a first embodiment of the structure of subframe 1 or subframe 2 before FEC encoding and sync code insertion.

FIG. 4 is a conceptual diagram illustrating a first embodiment of the structure of subframe 3 or subframe 4 before FEC encoding and sync code insertion.

FIG. 7 is a conceptual diagram showing a first embodiment of the structure of the subframe including the subframe characteristic indicator.

FIG. 8 is a conceptual diagram showing a second embodiment of the structure of the subframe including the subframe characteristic indicator.

DETAILED DESCRIPTION OF THE EMBODIMENTS

Figure 5:
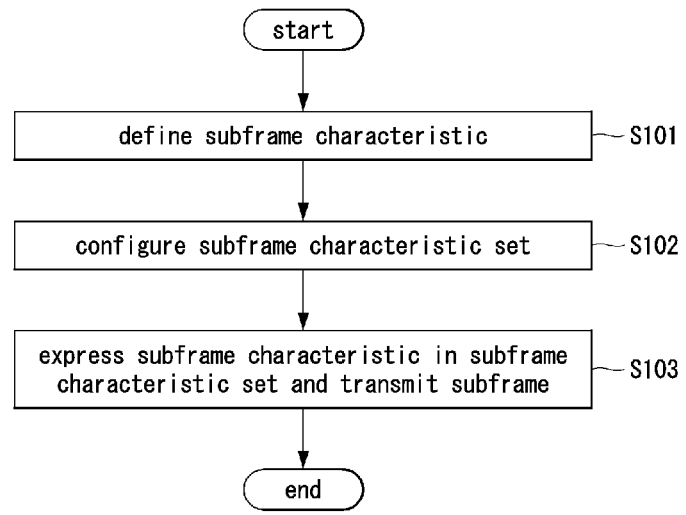
FIG. 5 is a flowchart illustrating a first embodiment of a method of transmitting GNSS subframe characteristic information.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram showing a first embodiment of a master frame structure of the Navigation Indian Constellation (NavIC).

Referring to FIG. 1, a data frame structure for delivering a message for the Standard Positioning Service (SPS) of the NavIC (or the Indian Regional Navigation Satellite System (IRNSS)), which is a global navigation satellite system (GNSS) of India) may be as follows. A master frame of the NavIC may include four subframes, and each subframe of the NavIC may include 600 symbols. The master frame of the NavIC may include 2,400 symbols. FIG. 2 is a conceptual diagram showing a first embodiment of the subframe structure of the NavIC.

Referring to FIG. 2, the subframe of the NavIC may include 600 symbols. The subframe of the NavIC may include synchronization (sync) code (or a preamble) for subframe synchronization and/or navigation data (or NAV data). The sync code may include a sync word, and the sync word may include the first 16 bits of the subframe of the NavIC. For the sync word, forward error correction (FEC) encoding may not be used. Also, EB90 Hex may be used as a sync pattern for the subframe synchronization of the NavIC. Navigation data (or NAV data) carried after the sync code of the subframe of the NavIC is data generated by FEC-encoding 292 bits at a coding rate of ½ and interleaving the encoded bits.

That is, a transmitter may FEC-encode 292 bits at a coding rate of ½ and may generate NAV data of 584 symbols by interleaving the encoded bits. The transmitter may generate an SPS signal by modulation with binary phase-shift keying (BPSK) and may transmit the generated SPS signal in the L5 band (1164.45 to 1188.45 MHz) and/or in the S band (2483.5 to 2500 MHz). Here, the symbol transmission rate of the modulated signal may be 50 symbols per second (sps), an FEC coding rate of ½ may be used, and the data transmission rate may be 25 bits per second (bps). The receiver may search for a sync pattern of the SPS signal received from the transmitter to acquire subframe synchronization and may acquire information delivered with a subframe through FEC decoding after the synchronization is acquired.

The NAV data may include 584 symbols after the sync code of the subframe of the NavIC. The subframe of the NavIC may include subframe 1, subframe 2, subframe 3, or subframe 4. Subframe 1, subframe 2, subframe 3, or subframe 4 may be indicated by a subframe ID (or a subframe number).

FIG. 3 is a conceptual diagram illustrating a first embodiment of the structure of subframe 1 or subframe 2 before FEC encoding and sync code insertion.

Referring to FIG. 3, the subframe structure before FEC encoding and sync code insertion of subframe 1 or subframe 2 may be as follows. Subframe 1 or subframe 2 is telemetry (TLM), time of week count (TOWC), alert flag, AUTONAV, subframe identifier (ID), spare, NAV data, a cyclic redundancy check (CRC) and/or a tail item. In FIG. 3, a number above each item may indicate a data bit position at which a corresponding item starts, and a number below each item may indicate the number of bits of a corresponding item.

The NAV data of subframe 1 and/or subframe 2 may include primary navigation parameter information. The above-described primary navigation parameter information may include at least one of satellite ephemeris information, satellite clock correction parameters, user range accuracy (URA) information, total group delay information, or satellite & signal health status.

The above-described URA may refer to a statistical indication of an accuracy range related to a specific space vehicle (SV), and the URA may provide 1-sigma estimation for user range errors of the NAV data through a value of 0 to 15. Table 1 below may show mapping between URA indices and URA values. For example, when the URA index value is set as URA=15, navigation accuracy prediction may indicate that 6144.00 meters (m)<URA or that no accuracy prediction is available.

TABLE 1

| Index value | URA(m) |
|---|---|
| 0 | 0.00 < URA ≤ 2.40 |
| 1 | 2.40 < URA ≤ 3.40 |
| 2 | 3.40 < URA ≤ 4.85 |
| 3 | 4.85 < URA ≤ 6.85 |
| 4 | 6.85 < URA ≤ 9.65 |
| 5 | 9.65 < URA ≤ 13.65 |
| 6 | 13.65 < URA ≤ 24.00 |
| 7 | 24.00 < URA ≤ 48.00 |
| 8 | 48.00 < URA ≤ 96.00 |

TABLE 1-continued

| Index value | URA(m) |
|---|---|
| 9 | 96.00 < URA ≤ 192.00 |
| 10 | 192.00 < URA ≤ 384.00 |
| 11 | 384.00 < URA ≤ 768.00 |
| 12 | 768.00 < URA ≤ 1536.00 |
| 13 | 1536.00 < URA ≤ 3072.00 |
| 14 | 3072.00 < URA ≤ 6144.00 |
| 15 | 6144.00 < URA (or no accuracy prediction is available-authorized users are advised to use the SV at their own risk.) |

FIG. 4 is a conceptual diagram illustrating a first embodiment of the structure of subframe 3 or subframe 4 before FEC encoding and sync code insertion.

Referring to FIG. 4, the subframe structure and/or details before FEC application for subframe 3 or subframe 4 may be as follows. Subframe 3 or subframe 4 is TLM, TOWC, alert flag, AUTONAV, subframe ID, spare, NAV data, PRN ID, CRC, and/or a tail item. In FIG. 4, a number above each item may indicate a data bit position at which a corresponding item starts, and a number below each item may indicate the number of bits of a corresponding item.

Subframe 3 and/or subframe 4 may include secondary navigation parameter information. The above-described secondary navigation parameter information may include satellite almanac information, ionospheric grid delay and confidence information, IRNSS time offset information for UTC and GNSS, ionospheric delay correction coefficients, text message, differential corrections, and/or earth orientation parameters.

Subframe 3 or subframe 4 may have various message types according to the details of data to be delivered. The details of data to be delivered by subframe 3 or subframe 4 may be identified by a message ID. For example, message type 0 may mean that the NAV data of the corresponding subframe is a null message, and message type 14 may mean that the NAV data of the corresponding subframe includes differential correction (DC) parameters for satellites.

The above-described DC parameters may provide the user with correction information to be applied to ephemeris data and/or a clock transmitted by other satellites in the AutoNav mode. The DC parameters may include ephemeris differential correction information and/or satellite clock differential correction (CDC) information. User differential range accuracy (UDRA) included in the above-described DC parameters may provide navigation accuracy to which differential correction is applied. Table 2 below may show mapping between UDRA index values and URDA. For example, UDRA may indicate that no accuracy prediction is available when UDRA=−16 and may be calculated as $UDRA=UDRA+U_{D^\# }A \cdot (t_k-t_{od})$ at a specific time $t_k$, other than $t_{od}$.

TABLE 2

| Index value | UDRA(m) | $U_{D^\#}A$ |
|---|---|---|
| 15 | 6144.00 < UDRA | — |
| 14 | 3072.00 < UDRA ≤ 6144.00 | 3072 |
| 13 | 1536.00 < UDRA ≤ 3072.00 | 1536 |
| 12 | 768.00 < UDRA ≤ 1536.00 | 768 |
| 11 | 384.00 < UDRA ≤ 768.00 | 384 |
| 10 | 192.00 < UDRA ≤ 384.00 | 192 |
| 9 | 96.00 < UDRA ≤ 192.00 | 96 |
| 8 | 48.00 < UDRA ≤ 96.00 | 48 |
| 7 | 24.00 < UDRA ≤ 48.00 | 24 |
| 6 | 13.65 < UDRA ≤ 24.00 | 13.65 |

TABLE 2-continued

| Index value | UDRA(m) | $U^{D^d}A$ |
|---|---|---|
| 5 | 9.65 < UDRA ≤ 13.65 | 9.65 |
| 4 | 6.85 < UDRA ≤ 9.65 | 6.85 |
| 3 | 4.85 < UDRA ≤ 6.85 | 4.85 |
| 2 | 3.40 < UDRA ≤ 4.85 | 3.4 |
| 1 | 2.40 < UDRA ≤ 3.40 | 2.4 |
| 0 | 1.70 < UDRA ≤ 2.40 | 1.7 |
| −1 | 1.20 < UDRA ≤ 1.70 | 1.2 |
| −2 | 0.85 < UDRA ≤ 1.20 | 0.85 |
| −3 | 0.60 < UDRA ≤ 0.85 | 0.6 |
| −4 | 0.43 < UDRA ≤ 0.60 | 0.43 |
| −5 | 0.30 < UDRA ≤ 0.43 | 0.3 |
| −6 | 0.21 < UDRA ≤ 0.30 | 0.21 |
| −7 | 0.15 < UDRA ≤ 0.21 | 0.15 |
| −8 | 0.11 < UDRA ≤ 0.15 | 0.11 |
| −9 | 0.08 < UDRA ≤ 0.11 | 0.08 |
| −10 | 0.06 < UDRA ≤ 0.08 | 0.06 |
| −11 | 0.04 < UDRA ≤ 0.06 | 0.04 |
| −12 | 0.03 < UDRA ≤ 0.04 | 0.03 |
| −13 | 0.02 < UDRA ≤ 0.03 | 0.02 |
| −14 | 0.01 < UDRA ≤ 0.02 | 0.01 |
| −15 | UDRA ≤ 0.01 | 0.005 |
| −16 | No accuracy prediction available-use at own risk | |

Table 3 below may show details related to each of the above-described items.

TABLE 3

| Item | Details |
|---|---|
| TLM & Spare | Reserved for future use |
| TOWC | Corresponding to start of next subframe |
| Alert Flag | Indicating to user that it is user's responsibility to utilize navigation data of particular satellite |
| AutoNav | Indicating AutoNav mode (using stored 7-day ephemeris information and clock correction parameters) |
| Subframe ID | 2-bit ID for distinguishing subframes |
| Message ID | Uniquely identifying message type (only for subframe 3 and subframe 4) |
| PRNID | Uniquely identifying starcraft (only for subframe 3 and subframe 4) |
| Data | Navigation data (NAV data) including IRNSS satellite ephemeris, IRNSS time, satellite clock correction parameters, status messages and/or secondary information |
| CRC & Tail | Adding 6-bit long tail bit for channel coding and decoding using 24-bit CRC |

Also, the NAV data may include a health flag ($L_5$ flag and/or S flag), and Table 4 below may show a description of the health flag.

TABLE 4

| Flag | Value | Description |
|---|---|---|
| L5 flag | 0 | All NAV data on L5 SPS signal are OK |
| L5 flag | 1 | Some or all NAV data on L5 SPS signal are bad |
| S flag | 0 | All NAV data on S SPS signal are OK |
| S flag | 1 | Some or all NAV data on S SPS signal are bad |

Global navigation satellite systems (GNSSs) other than NavIC (e.g., Global Positioning System (GPS) in the United States, global navigation satellite system (GLONASS) in Russia and/or Galileo in Europe) may include a subframe having a similar structure to the subframe structure of NavIC.

Meanwhile, a satellite navigation system having the above-described subframe structure (or a similar subframe structure) may acquire information (or data) delivered by each subframe after subframe synchronization is acquired and decoding is performed. At this time, even if a subframe includes data that the terminal cannot use or does not need, a receiver in the satellite navigation system may receive and/or decode the subframe, examine information on each item, and then determine whether the corresponding subframe is what it needs.

Therefore, in the above-described satellite navigation system for transmitting and receiving subframes, it may be necessary to receive and/or decode a subframe including data that is not usable by general receivers or unnecessary. Therefore, in the above-described satellite navigation system, even if a subframe includes data that is not usable by terminals or unnecessary, power may be consumed in receiving and/or decoding the subframe.

Also, in the above-described satellite navigation system for transmitting and receiving subframes, it may be difficult to explicitly deliver frame configuration information to the receiver when frame configuration is adaptively performed according to a channel state between a satellite and a service area. Also, in the above-described satellite navigation system for transmitting and receiving subframes, it may be difficult for a transmitter to explicitly deliver the frame configuration information to the receiver, and it may be difficult to adaptively configure subframes.

Also, in the satellite navigation system for transmitting and receiving subframes, even if the subframe is generally unusable due to a bad state or low accuracy of data, the receiver may recognize that unnecessary information has been received only after receiving and decoding the subframe. That is, the receiver may need to receive and/or decode subframes that are not needed.

As an example, even when the receiver does not use corresponding frame information because the alert flag of the subframe is displayed and the receiver recognizes that there is a risk to the user due to the use of navigation data of a specific satellite delivered by the corresponding subframe, the receiver may need to receive and/or decode subframes that are not used.

As another example, even if the health flag of the NAV data of subframes 1 and/or 2 is set to 1 and the corresponding NAV data is bad and thus not used, the receiver may recognize that the NAV data is bad after receiving and/or decoding the corresponding subframe.

As another example, when the URA of the NAV data of subframe 1 is equal to 15 (URA=15), that is, even when the receiver does not use the corresponding data because the navigation accuracy prediction is 6144.00 m<URA or no accuracy prediction is available, the receiver may need to receive the corresponding subframe and/or perform channel decoding.

As another example, even when the transmitter has no data to be transmitted and thus transmits, in a subframe, an idle pattern in which "0" and "1" are repeatedly sent, the receive may discover that meaningless data has been received only after receiving and/or decoding the corresponding subframe.

As still another example, when the transmitter transmits subframe 3 or subframe 4 of message type 0 in which a null message is transmitted, the receiver may discover that the receiver has received a null message that it does not need after receiving and/or decoding the corresponding subframe.

As still another example, when the UDRA value of the NAV data of subframe 3 or subframe 4 is equal to −16 (UDRA=−16), that is, when no accuracy prediction is available, the receiver can discern that there is an accuracy problem after receiving and/or decoding the above-described subframe even if the data included in the subframe is not used due to the accuracy problem in the subframe.

Also, in the above-described conventional satellite navigation system for transmitting and receiving subframes, the receiver may need to receive and/or decode a subframe including unnecessary data. That is, the receiver may only need information delivered in a specific subframe, and in this case, the receiver may also need to receive and/or decode a subframe including unnecessary data. This is because there are cases in which the receiver cannot discover whether the frame is a subframe including necessary data before receiving and/or decoding the subframe.

As an example, the receiver may only need information delivered in subframe 1 and/or subframe 2. For example, when the receiver first wants to obtain a navigation solution, or when frame synchronization is lost, the receiver may want to obtain synchronization and a navigation solution again. In this case, the receiver may already have satellite almanac information or may have received it through another path such as a cellular network, and the receiver may need clock correction parameters and/or ephemeris information of the satellite. The receiver may want to receive subframe 1 and/or subframe 2 in order to acquire necessary information. At this time, even if the subframe that the receiver receives for the first time is subframe 3 or subframe 4, which is a subframe that the receiver does not need, the receiver may discover that the corresponding subframe is a subframe that delivers unnecessary information after receiving and/or decoding subframe 3 or subframe 4 and then checking a subframe ID thereof.

As another example, the receiver may only need information delivered in subframes 1 and/or 2, which includes only information other than previously transmitted information (e.g., ephemeris information and/or clock correction parameters). That is, when the information included in subframe 1 and/or subframe 2 is the same as information included in the previous frame, some receivers may not need the corresponding subframe. The ephemeris information and/or clock correction parameters delivered in subframe 1 and/or subframe 2 may be information that does not change for a certain period of time, and some receivers that have already received the information may not need to receive ephemeris information and/or clock correction parameters for a period of time unless the ephemeris information and/or clock correction parameters are updated. Even in the above-described case, the receiver may discover the need for the corresponding information after receiving and/or decoding subframes 1 and/or 2.

As another example, the receiver may only need information delivered in subframe 3 and/or subframe 4. At this time, even if the subframe that the receiver receives is subframe 1 or subframe 2, which is a subframe that the receiver does not need, the receiver may discover that the corresponding subframe is a subframe that delivers unnecessary information after receiving and/or decoding subframe 1 or subframe 2 and then checking a subframe ID thereof.

Also, the above-described satellite navigation system for transmitting and receiving subframes has disadvantages in that it may be difficult to explicitly deliver frame configuration information when frame configuration is adaptively performed according to a channel state between a satellite and a service area.

As an example, when the coding rate of the FEC is changed according to the channel state between the satellite and the service area, the satellite navigation system can lower the frame error rate and reduce the time taken to derive a navigation solution. For example, the Block IIR-M satellite of the GPS may transmit the L2 (1227.60 MHz) civil moderate (CM) channel, which is transmitted at 50 bps, at 25 bps by using the FEC having a coding rate of ½ according to the command of a ground station. On the other hand, in the above-described conventional satellite navigation system for transmitting and receiving subframes, the receiver may have to implicitly find the coding rate of the FEC. Thus, the complexity of the receiver may be increased, and it may be difficult to frequently change the coding rate.

In order to solve the above-mentioned disadvantages, a method and/or apparatus for defining and/or configuring subframe characteristics, which are information obtained by summarizing the characteristics of a format and/or information to be delivered by a satellite navigation system, will be described below. Also, in order to solve the above-mentioned disadvantages, a method and/or apparatus for receiving subframe characteristic information, which is information obtained by summarizing the format and/or data characteristics of a subframe in a satellite navigation system, and performing an operation suitable for the characteristics will be described below. Also, in order to solve the above-mentioned disadvantages, a method and/or apparatus for transmitting and/or receiving subframe characteristics, which are information obtained by summarizing the characteristics of a format and/or information to be delivered in subframes by a satellite navigation system, will be described below.

For this purpose, hereinafter, the transmitter may define the subframe characteristics (e.g., subframe elements), the transmitter may configure a subframe characteristic set using the subframe characteristic information, and the transmitter may transmit information indicating a subframe characteristic in the subframe characteristic set to the receiver.

Also, the receiver may receive a subframe from the transmitter, the receiver may discern the characteristics of the subframe on the basis of information included in the received subframe, and the receiver may reception and/or decoding operations based on the subframe characteristic information. For example, the receiver may discern the format of the subframe by discerning the characteristics of the subframe based on the subframe characteristic information of the received subframe, and the receiver may perform reception and/or decoding operations suitable for the format of the received subframe. Also, the receiver may discern data state information, a data content type, and/or data content changes of the corresponding subframe on the basis of the subframe characteristic information of the received subframe, and the receiver may perform reception and/or decoding operations suitable for the data state information, the data content type, and/or the data content changes of the subframe. To this end, the transmitter and the receiver may share subframe characteristics beforehand, or the subframe characteristics may be predefined in the technical standard.

Hereinafter, the embodiments will be described in detail with reference to the accompanying drawings. However, since various changes may be made to the embodiments, the scope of the patent application is not limited or restricted by these embodiments. It should be understood that all changes, equivalents or substitutes for the embodiments are included in the scope of the present disclosure. Terms used in the embodiments are for the purpose of description only and should not be construed as limiting the embodiments. Terms used in the embodiments for an interference signal are for the purpose of description only and should not be construed as limiting the embodiments. Singular and plural expressions used in the embodiments are for the purpose of describing the embodiments and should not be used for the purpose of limiting the intent of the embodiments.

The satellite navigation system may define subframe characteristic information and configure a subframe characteristic set. The transmitter and the receiver may share information on the subframe characteristic information and/or the subframe characteristic set beforehand. The subframe characteristic information may refer to the characteristics of a format and/or data to be delivered by the subframe. The subframe characteristic information may be included in the corresponding subframe. Table 5 below may show examples of the "subframe characteristic information."

TABLE 5

Subframe characteristic information

Data to be delivered (by a corresponding subframe) is OK and is high-accuracy information
Data to be delivered (by a corresponding subframe) is bad and includes low-accuracy information
Data of a corresponding subframe (subsequent to sync word) uses a coding rate of 1/2
Data to be delivered by a corresponding subframe does not use channel coding
~
Subframe ID is 1
Subframe ID is 2
Subframe ID is 3
Subframe ID is 4
Subframe ID is 5
~
Alert flag = 1
~
URA = 15
Subframe characteristics are not described As an embodiment, when all of an alert flag, an idle pattern, a satellite signal state, a signal health state, URA, message type 0, and a UDRA value among the data of the subframe indicate data that general receivers can use, the corresponding subframe characteristic information may indicate a subframe in which data to be delivered is OK and includes high-accuracy information. Alternatively, when at least one of an alert flag, an idle pattern, a satellite signal state, a signal health state, URA, message type 0, and a UDRA value among the data of the subframe indicates data that general receivers cannot use, the corresponding subframe characteristic information may indicate a subframe in which data is bad and which includes low-accuracy information.

As another embodiment, when the subframe is a subframe that uses a coding rate of ½, the subframe characteristic information of the corresponding subframe may indicate a subframe that uses a coding rate of ½. Alternatively, when channel coding is not used for data to be delivered by a subframe, the subframe characteristic information of the corresponding subframe may indicate that the data to be delivered by the subframe did not use channel coding.

As still another embodiment, when the satellite navigation system does not describe subframe characteristics and operates like the conventional GNSS system, the subframe characteristic information may indicate that the subframe characteristics are not described. As still another embodiment, the subframe characteristic information may be expressed as a combination of the subframe characteristics as follows. For example, when the subframe is a subframe in which data to be delivered is OK and includes high-accuracy information and also the subframe is a subframe that uses a coding rate of ½, the characteristics of the subframe may be expressed as "the subframe characteristic=a subframe in which data to be delivered is OK and which includes high-accuracy information & a subframe in which a coding rate of ½ is used for channel coding." Table 4 below may show a first embodiment of the configuration of a "subframe characteristic set."

The satellite navigation system may configure a "subframe characteristic set," which is a set of "subframe characteristic information." The satellite navigation system may configure the "subframe characteristic set," which includes a subframe characteristic information ID. The transmitter and the receiver may share information on "subframe characteristic information and/or subframe characteristic set" beforehand. The subframe characteristic information may be expressed by summarizing the characteristics of a format and/or data to be delivered by the subframe. Table 6 below may show the first embodiment of the configuration of the "subframe characteristic set."

TABLE 6

| Subframe characteristic information ID | Subframe characteristic information |
|---|---|
| 1 | Data to be delivered (by a corresponding subframe) is OK and is high-accuracy information |
| 2 | Data to be delivered (by a corresponding subframe) is bad or includes low-accuracy information |

Table 7 below may show a second embodiment of the configuration of the subframe characteristic set.

TABLE 7

| Subframe characteristic information ID | Subframe characteristic information |
|---|---|
| 1 | (Data of a corresponding subframe) uses channel coding with a coding rate of 1/2 |
| 2 | (Data of a corresponding subframe) does not use channel coding |

Table 8 below may show a third embodiment of the configuration of the subframe characteristic set.

TABLE 8

| Subframe characteristic information ID | Subframe characteristic information |
|---|---|
| 1 | Data to be delivered (by a corresponding subframe) is OK and is high-accuracy information |
| 2 | Data to be delivered (by a corresponding subframe) is bad or includes low-accuracy information |
| 3 | The format of a corresponding subframe uses a format defined by default |
| 4 | The format of a corresponding subframe uses an option 1 format |
| 5 | The format of a corresponding format uses an option 2 format |
| 6 | Reserved for future use |
| 7 | Reserved for future use |
| 8 | Reserved for future use |

Table 9 below may show a fourth embodiment of the configuration of the subframe characteristic set.

TABLE 9

| Subframe characteristic information ID | Subframe characteristic information |
|---|---|
| 1 | Not describing subframe characteristics |

TABLE 9-continued

| Subframe characteristic information ID | Subframe characteristic information |
|---|---|
| 2 | Data to be delivered (by a corresponding subframe) is OK and is high-accuracy information |
| 3 | Data to be delivered (by a corresponding subframe) is bad or includes low-accuracy information |
| 4 | (Data of a corresponding subframe) uses channel coding with a coding rate of 1/2 |
| 5 | (Data of a corresponding subframe) does not use channel coding |
| ~ | ~ |
| ~ | Alert flag = 1 |
| 99 | ~ |
| ~ | Data to be delivered by a corresponding subframe is OK and includes high-accuracy information, and the data of the corresponding subframe uses channel coding with a coding rate of 1/2 |
| ~ | ~ |

The transmitter and the receiver may share the above-described configuration of the subframe characteristic set shown in Tables 6 to 9 beforehand. Using the subframe characteristic set shared by the transmitter and the receiver beforehand, the transmitter may transmit subframe characteristic information obtained by summarizing the characteristics of the subframe to be transmitted, and the receiver may receive subframe characteristic information obtained by summarizing the characteristics of the received subframe. That is, the transmitter may transmit a subframe including the subframe characteristic information ID included in the subframe characteristic set to the receiver, and the receiver may receive a subframe including the subframe characteristic information ID included in the subframe characteristic set from the transmitter.

FIG. 5 is a flowchart illustrating a first embodiment of a method of transmitting GNSS subframe characteristic information.

Referring to FIG. 5, in a satellite navigation system, a transmitter may define subframe characteristic information (S101) and may configure a subframe characteristic set (S102). The transmitter may transmit the configuration of the subframe characteristic information and/or the configuration of the subframe characteristic set to a receiver beforehand. The transmitter may express the characteristics of the subframe to be transmitted to the receiver as a subframe characteristic information ID in the above-described subframe characteristic set, and the transmitter may transmit a subframe including the subframe characteristic information ID to the receiver (S103).

Figure 6:
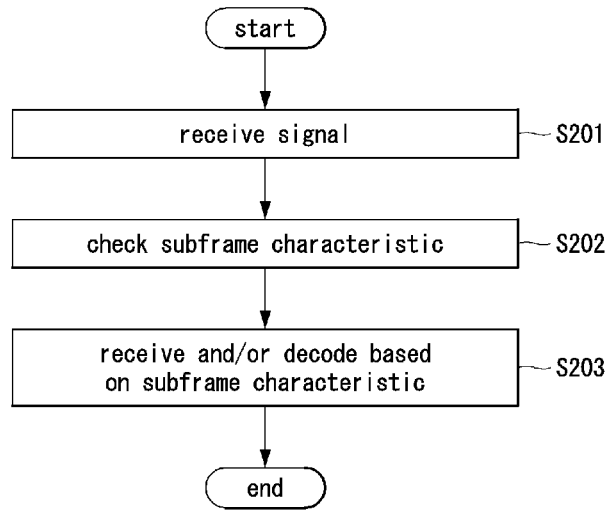
FIG. 6 is a flowchart illustrating a first embodiment of a method of receiving GNSS subframe characteristic information.

FIG. 6 is a flowchart illustrating a first embodiment of a method of receiving GNSS subframe characteristic information.

Referring to FIG. 6, in a satellite navigation system, a receiver may receive an SPS signal (S201) and may check the characteristics of a subframe on the basis of a subframe characteristic information ID included in the subframe (S202). The receiver may perform reception and/or decoding operations suitable for the purpose of the receiver or the characteristics of the subframe on the basis of the checked characteristics of the subframe (S203).

The transmitter and the receiver may share the configuration of sync words and/or a meaning associated with each sync word beforehand. Accordingly, the receiver may receive and/or identify a sync word included in the corresponding subframe to acquire subframe synchronization, and the receiver may receive and/or identify the sync word included in the corresponding subframe to discern the characteristics of the received subframe. The receiver may receive and decode data subsequent to the sync word according to the discerned characteristics of the subframe, the receiver may not receive and/or decode data according to the discerned characteristics of the corresponding subframe, and the receiver may operate in a sleep mode for a preset time according to the discerned characteristics of the corresponding subframe.

As an embodiment, the transmitter may express the subframe characteristic information ID included in the subframe characteristic set using the sync word of the subframe, and the transmitter may transmit the subframe including the sync word to the receiver. That is, the transmitter may express the characteristics of data to be delivered by each subframe using a different sync word and may transmit the subframe including the sync word to the receiver.

For example, when the transmitter and the receiver share a subframe characteristic set as shown in Table 6 above beforehand, the transmitter may configure different sync words 10001011 01010101 and 11101011 10010000 as shown in Table 10 below, and the transmitter may express the subframe characteristic information IDs 1 and 2 through the sync words 10001011 01010101 and 11101011 10010000. The transmitter and the receiver may share the sync words, the subframe characteristic information IDs and/or meanings (data characteristics) related to the subframe characteristic information IDs beforehand. When data to be delivered is not usable by general receivers (i.e., at least one of an alert flag, an idle pattern, a satellite health state, a signal health state, URA, message type 0, and/or a UDRA value is data that is not usable by general receivers), 10001011 01010101 may be configured (or selected) as the sync word. When data to be delivered is usable by general receivers (i.e., at least one of an alert flag, an idle pattern, a satellite health state, a signal health state, URA, message type 0, and/or a UDRA value is data that is usable by general receivers), 11101011 10010000 may be selected as the sync word. The transmitter may transmit the subframe including the sync word that expresses the subframe characteristic information ID to the receiver.

TABLE 10

| Sync word | Subframe characteristic information ID | Subframe characteristic information |
|---|---|---|
| 10001011 01010101 | 1 | Data to be delivered (by a corresponding subframe) is OK and is high-accuracy information |
| 11101011 10010000 | 2 | Data to be delivered (by a corresponding subframe) is bad or is low-accuracy information |

The sync words 10001011 01010101 and 11101011 10010000 described in the above example are values that are arbitrarily selected for the purpose of illustration, and other arbitrary values may be used. Also, the length of the sync words described in the above example is a value that is arbitrarily selected for the purpose of illustration, and other arbitrary lengths may be used.

Alternatively, the transmitter may express the subframe ID of each subframe using a different sync word and may transmit the subframe including the sync word to the receiver. For example, the sync word 10001011 01010101 among the different sync words may indicate subframe 1 or 2, and the sync word 11101011 10010000 among the different sync words may indicate subframe 3 or 4. The receiver may acquire subframe synchronization using the sync word included in the subframe, and the receiver may identify the subframe ID of the corresponding subframe using the sync word that expresses the subframe characteristic information ID. Accordingly, the receiver may selectively receive only necessary subframes.

Alternatively, when the transmitter and the receiver share a subframe characteristic set as shown in Table 7 above beforehand, the transmitter may configure different sync words 10001011 01010101 and 11101011 10010000 as shown in Table 11 below, and the transmitter may express the subframe characteristic information IDs 1 and 2 through the sync words 10001011 01010101 and 11101011 10010000. The transmitter may select 10001011 01010101 as the sync word when the data of the corresponding subframe uses channel coding with a coding rate of ½ and may select 11101011 10010000 as the sync word when the data of the corresponding subframe does not use channel coding. The transmitter may transmit the subframe including the sync word that expresses the subframe characteristic information ID to the receiver. The receiver may acquire subframe synchronization using the sync word included in the subframe, and the receiver may discern a coding rate used for the corresponding subframe using the sync word included in the subframe. The receiver may perform decoding suitable for the identified data characteristic information (i.e., suitable for the channel coding used for the corresponding subframe).

TABLE 11

| Sync word | Subframe characteristic information ID | Subframe characteristic information |
|---|---|---|
| 10001011 01010101 | 1 | (Data of a corresponding subframe) uses channel coding with a coding rate of 1/2 |
| 11101011 10010000 | 2 | (Data of a corresponding subframe) does not use channel coding |

Alternatively, when the transmitter and the receiver share the subframe characteristic set as shown in Table 8 above beforehand, the transmitter may configure different sync words 10001011 01010101, 11101011 10010000, 01010100 01001111, 01101001 11010000, . . . , and 10101011 10001011 as shown in Table 12 below. The transmitter may select 10001011 01010101 as the sync word when the corresponding subframe is a subframe in which data to be delivered is OK and is high-accuracy information and may select 11101011 10010000 as the sync word when the corresponding subframe is a subframe in which data to be delivered is bad or which includes low-accuracy information. The transmitter may select 01010100 01001111 as the sync word when the format of the corresponding subframe uses a format defined by default and may select 01101001 11010000 as the sync word when the format of the corresponding subframe uses an option 1 format. The transmitter may transmit the subframe including the sync word that expresses the subframe characteristic information ID to the receiver. The receiver may acquire subframe synchronization using the sync word included in the subframe, and the receiver may discern the characteristics of the corresponding subframe using the sync word included in the subframe. The receiver may perform reception and/or decoding suitable for the identified data characteristic information.

TABLE 12

| Sync word | Subframe characteristic information ID | Subframe characteristic information |
|---|---|---|
| 10001011 01010101 | 1 | Data to be delivered (by a corresponding subframe) is OK and is high-accuracy information |
| 11101011 10010000 | 2 | Data to be delivered (by a corresponding subframe) is bad or includes low-accuracy information |
| 01010100 01001111 | 3 | The format of a corresponding subframe uses a format defined by default |
| 01101001 11010000 | 4 | The format of a corresponding subframe uses an option 1 format |
| ~ | 5 | The format of a corresponding subframe uses an option 2 format |
| ~ | 6 | Reserved for future use |
| ~ | 7 | Reserved for future use |
| ~ | 8 | Reserved for future use |
| ~ | ~ | ~ |
| 10101011 10001011 | ~ | Reserved for future use |

Alternatively, when the transmitter and the receiver share the subframe characteristic set as shown in Table 9 above beforehand, the transmitter may configure different sync words 10001011 01010101, 11101011 10010000, 01010100 01001111, 01101001 11010000, . . . , and 10101011 10001011 as shown in Table 13 below. The transmitter may select 10001011 01010101 as the sync word when the corresponding subframe is a subframe in which data to be delivered is OK and is high-accuracy information and may select 11101011 10010000 as the sync word when the corresponding subframe is a subframe in which data to be delivered is bad or which includes low-accuracy information. The transmitter may select 01010100 01001111 as the sync word when the data of the corresponding subframe uses channel coding with a coding rate of ½ and may select 01101001 11010000 as the sync word when the data of the corresponding subframe does not use channel coding. When the subframe ID of the corresponding subframe is 4, the transmitter may select 10101011 10001011 as the sync word. The transmitter may transmit the subframe including the sync word that expresses the subframe characteristic information ID to the receiver. The receiver may acquire subframe synchronization using the sync word included in the subframe, and the receiver may discern the characteristics of the corresponding subframe using the sync word included in the subframe. The receiver may perform reception and/or decoding suitable for the identified data characteristic information. As an example, when the receiver does not need information transmitted in subframe 4, the receiver does not need to receive data when the sync word included in the received subframe is 10101011 10001011, and thus the receiver may operate in a sleep mode for a preset time.

TABLE 13

| Sync word | Subframe characteristic information ID | Subframe characteristic information |
|---|---|---|
| 10001011 01010101 | 1 | Data to be delivered (by a corresponding subframe) is OK and is high-accuracy information |
| 11101011 10010000 | 2 | Data to be delivered (by a corresponding subframe) is bad or includes low-accuracy information |
| 01010100 01001111 | 3 | (Data of a corresponding subframe) uses channel coding with a coding rate of 1/2 |

TABLE 13-continued

| Sync word | Subframe characteristic information ID | Subframe characteristic information |
| --- | --- | --- |
| 01101001 11010000 | 4 | (Data of a corresponding subframe) does not use channel coding |
| ~ | ~ | ~ |
| ~ | ~ | Alert flag = 1 |
| ~ | ~ | ~ |
| ~ | 99 | Data to be delivered by a corresponding subframe is OK and is high-accuracy information, and the data of the corresponding subframe uses channel coding with a coding rate of 1/2 |
| ~ | ~ | ~ |
| 10101011 10001011 | ~ | Subframe ID is 4 |

As another embodiment, the transmitter may express the subframe characteristic information ID included in the subframe characteristic set using the subframe characteristic indicator, which is in a new data format and/or area, and the transmitter may transmit the subframe including the above subframe characteristic indicator to the receiver. That is, the transmitter may express the characteristics of data to be delivered by each subframe using the subframe characteristic indicator and may transmit the subframe including the above-described subframe characteristic indicator to the receiver.

FIG. 7 is a conceptual diagram showing a first embodiment of the structure of the subframe including the subframe characteristic indicator.

Referring to FIG. 7, the subframe including the subframe characteristic indicator may have the following structure. The subframe including the subframe characteristic indicator may include a sync word, subframe characteristic information, and/or subframe data. The sync word included in the subframe may consist of the first 16 bits of the subframe. The subframe characteristic indicator included in the subframe may consist of a bits, and a is a natural number that is greater than or equal to 1 and less than 584. Also, the subframe data included in the subframe may consist of 584-a bits. Here, channel coding different from that of the subframe data may be used for the subframe characteristic indicator. Alternatively, here, channel coding may not be used for the subframe characteristic indicator like a sync word.

For example, when the transmitter and the receiver share the subframe characteristic set as shown in Table 6 above beforehand, the subframe feature indicator may be expressed using the following bits (e.g., eight bits when a=8) as shown in Table 14 below.

TABLE 14

| Subframe characteristic indicator | Subframe characteristic information ID | Subframe characteristic information |
| --- | --- | --- |
| 1111 1111 | 1 | Data to be delivered by a corresponding subframe is OK and is high-accuracy information |
| 0000 0000 | 2 | Data to be delivered by a corresponding subframe is bad or is low-accuracy information |

In this case, the receiver may interpret that the subframe characteristic information ID is equal to 1 when the result of combining 8 consecutive bits of the subframe characteristic indicator is positive (+), and the receiver may interpret that the subframe characteristic information ID is equal to 0 when the result of combining 8 consecutive bits of the subframe characteristic indicator is negative (−). Alternatively, when the receiver fails to decode the subframe characteristic indicator, the receiver may ignore the subframe characteristic indicator and receive subframe data.

FIG. 8 is a conceptual diagram showing a second embodiment of the structure of the subframe including the subframe characteristic indicator.

Referring to FIG. 8, the subframe including the subframe characteristic indicator may have the following structure. The subframe including the subframe characteristic indicator may include a sync word, a subframe characteristic indicator, subframe characteristic information, and/or subframe data. Here, in order to increase the reception performance of the subframe characteristic indicator, a diversity technique may be used for the subframe characteristic indicator as follows. For example, a first subframe characteristic indicator may consist of the first a/2 bits of the subframe (e.g., four bits when a=8), the sync word may consist of 16 bits after the subframe characteristic indicator, a second subframe characteristic indicator may consist of a/2 bits subsequent to the sync word, and the subframe data may consist of 584-a bits after the second subframe characteristic indicator.

As a third embodiment of the structure of the subframe including the subframe characteristic indicator, a portion of the subframe characteristic indicator may be located at the end of the previous subframe.

As still another embodiment, the transmitter may express the subframe characteristic information ID included in the subframe characteristic set using the sync word at a specific time $t_k$. At the same time, the transmitter may express the subframe characteristic information ID using the subframe characteristic indicator at the specific time. That is, the transmitter may express the characteristics of data to be delivered by a subframe at the specific time $t_k$ by mixing the characteristics with the sync word or the subframe characteristic indicator. For example, by hierarchically configuring the sync word, the transmitter may use the first eight bits of the 16-bit sync word to indicate the subframe characteristic set and may use the last eight bits to indicate the subframe characteristic information ID in the subframe characteristic set.

As still another embodiment, the transmitter may express the subframe characteristic information ID included in the subframe characteristic set using the sync word at the specific time $t_k$. At another time, the transmitter may express the subframe characteristic information ID using the subframe characteristic indicator at a specific time (e.g., $t_{k+1}$).

As still another embodiment, the satellite navigation system may switch the subframe characteristic set. In this case, in order to prevent the satellite navigation system from frequently switching the subframe characteristic set, the switching time for the subframe characteristic set may be restricted. That is, the satellite navigation system may be set to perform the switching of the subframe characteristic set after a predetermined time.

As still another embodiment, by combining the configuration of different sync words and the configuration of a hierarchical sync word, the first eight bits of the 16-bit sync word may be used to indicate the subframe characteristic set using the different sync words, and the last eight bits may be used to indicate the subframe characteristic information ID in the subframe characteristic set using the different sync words.

Also, although only some operations of the receiver have been described above, the present application may include other examples of acquiring subframe synchronization by possible combinations and/or methods and extracting characteristic information of the corresponding subframe.

The present disclosure may include a method and/or apparatus for configuring, by the transmitter, a subframe characteristic configuration table that defines and contains subframe characteristic elements expressing the characteristics (e.g., a subframe format including status and accuracy, details and type, a coding rate, etc.) of data to be delivered by a subframe, a method and/or apparatus for expressing a subframe characteristic configuration table and subframe characteristic elements in the subframe characteristic configuration table, a method and/or apparatus for selecting, by the transmitter, a subframe characteristic element corresponding to a subframe characteristic and then configuring a subframe including expression information, a method and/or apparatus for transmitting, by the transmitter, the configured subframe, a method and/or apparatus for receiving, by the receiver, the transmitted subframe and discerning the subframe characteristic from the expression information for the subframe characteristic elements in the subframe, and a method and/or apparatus for performing, by the receiver, an operation suitable for receiver requirements and the subframe characteristic after discerning the subframe characteristic.

The above-described operation suitable for the receiver requirements may include the following.

The present disclosure may include a method and/or apparatus for determining, by the receiver, whether to receive and decode subsequent corresponding subframe data after discerning the above-described subframe characteristic, a method and/or apparatus for determining, by the receiver, a method of receiving and decoding subsequent corresponding subframe data after discerning the subframe characteristic, and a method and/or apparatus for entering, by the receiver, a sleep mode for a certain period to save energy when it is determined not to receive and decode subsequent corresponding subframe data.

Also, the present disclosure may include the following. The present disclosure may include a method and/or apparatus for selecting, by the transmitter, a sync word that matches the characteristics of data to be transmitted and configuring and transmitting the subframe, a method and/or apparatus for receiving and identifying, by the receiver, the sync word and obtaining subframe synchronization, a method and/or apparatus for discerning, by the receiver, the characteristics of data to be delivered by the subframe on the basis of the identified sync word, a method and/or apparatus for determining, by the receiver, whether to receive and decode the subframe data subsequent to the sync word after discerning the characteristics of data to be delivered by the identified subframe or a method and/or apparatus for determining, by the receiver, a method of receiving and decoding subframe data subsequent to the sync word after discerning the characteristics of data to be delivered by the identified subframe, and a method and/or apparatus for entering, by the receiver, a sleep mode for a certain period to save energy when it is determined not to receive and decode subframe data subsequent to the sync word.

According to the present disclosure, the transmitter may transmit information summarizing the subframe characteristics. Also, according to the present disclosure, the transmitter may adaptively change the format of the subframe and inform the receiver of the format. Also, according to the present disclosure, the receiver may discern the subframe characteristics without receiving and decoding the subframe data. Also, according to the present disclosure, by discerning the format of the subframe, the receiver can receive the adaptively transmitted subframe. Also, according to the present disclosure, by avoiding unnecessary reception operations, the receiver can save energy and quickly derive a navigation solution with a low error rate.

Also, according to the present disclosure, by discerning the characteristics of the subframe, the receiver may discern data state information, a data content type, and/or a data content change of the subframe and may perform a reception operation according to the purpose of the receiver. Also, according to the present disclosure, by discerning the characteristics of the subframe, the receiver may discern the format of the subframe and perform a reception operation suitable for the format.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for a first device, the method comprising operations of:
   receiving a subframe including first information, which is characteristic information of the subframe, from a second device;
   checking the characteristic information of the subframe on the basis of the first information; and
   determining whether to decode data included in the subframe on the basis of the checked characteristic information of the subframe,
   wherein the first information is indicated by a sync word included in the subframe, and when a mapping relationship between the first information and the subframe number of the subframe is preset, the subframe number of the subframe is checked based on the sync word.

2. The method of claim 1, further comprising, when it is determined to perform decoding of the data, an operation of performing a decoding operation of the data on the basis of coding rate information used for channel coding of the data indicated by the first information.

3. The method of claim 1, further comprising operations of, before the operation of determining whether to decode data;
   determining whether to receive data included in the subframe on the basis of the first information; and operating in a sleep mode for a preset time when it is determined not to receive the data included in the subframe.

4. The method of claim 1, wherein when a mapping relationship between the first information and the accuracy of the subframe is preset, the accuracy of the subframe is checked based on the sync word, and the accuracy is the accuracy of navigation information indicated by the data included in the subframe.

5. The method of claim 1, wherein when a mapping relationship between the first information and whether or not channel coding of the subframe is used is preset, whether or not the channel coding of the subframe is used is checked based on the sync word.

6. A method for a first device, the method comprising operations of:
   receiving a subframe including first information, which is characteristic information of the subframe, from a second device;
   checking the characteristic information of the subframe on the basis of the first information; and
   determining whether to decode data included in the subframe on the basis of the checked characteristic information of the subframe,
   wherein when the subframe includes a sync word, a subframe characteristic indicator, and the data, the first information is indicated by the subframe characteristic indicator.

7. The method of claim 6, wherein when a mapping relationship between the first information and each of the subframe number and the accuracy of the subframe is preset, each of the subframe number and the accuracy of the subframe is checked based on the subframe characteristic indicator, and the accuracy is the accuracy of navigation information indicated by the data included in the subframe.

8. The method of claim 6, wherein when a mapping relationship between the first information and the accuracy of the subframe is preset, the accuracy of the subframe is checked based on the subframe characteristic indicator.

9. A first device comprising:
   a processor;
   a memory configured to electronically communicate with the processor; and
   instructions stored in the memory,
   wherein when the instructions are executed by the processor, the instructions cause the first device to:
   receive a subframe including first information, which is characteristic information of the subframe, from a second device;
   check the characteristic information of the subframe on the basis of the first information; ands
   determine whether to decode data included in the subframe on the basis of the characteristic information of the subframe,
   wherein the first information is indicated by a sync word included in the subframe, and when a mapping relationship between the first information and the subframe number of the subframe is preset, the subframe number of the subframe is checked based on the sync word.

10. A first device comprising at least one processor, wherein the at least one processor causes the first device to perform:
    receive a subframe including first information, which is characteristic information of the subframe, from a second device;
    check the characteristic information of the subframe on the basis of the first information; and
    determine whether to decode data included in the subframe on the basis of the characteristic information of the subframe,
    wherein when the subframe includes a sync word, a subframe characteristic indicator, and the data, the first information is indicated by the subframe characteristic indicator.

* * * * *